No. 736,667. PATENTED AUG. 18, 1903.
C. E. WOODS.
MULTIVOLTAGE SYSTEM.
APPLICATION FILED JUNE 12, 1902.
NO MODEL.
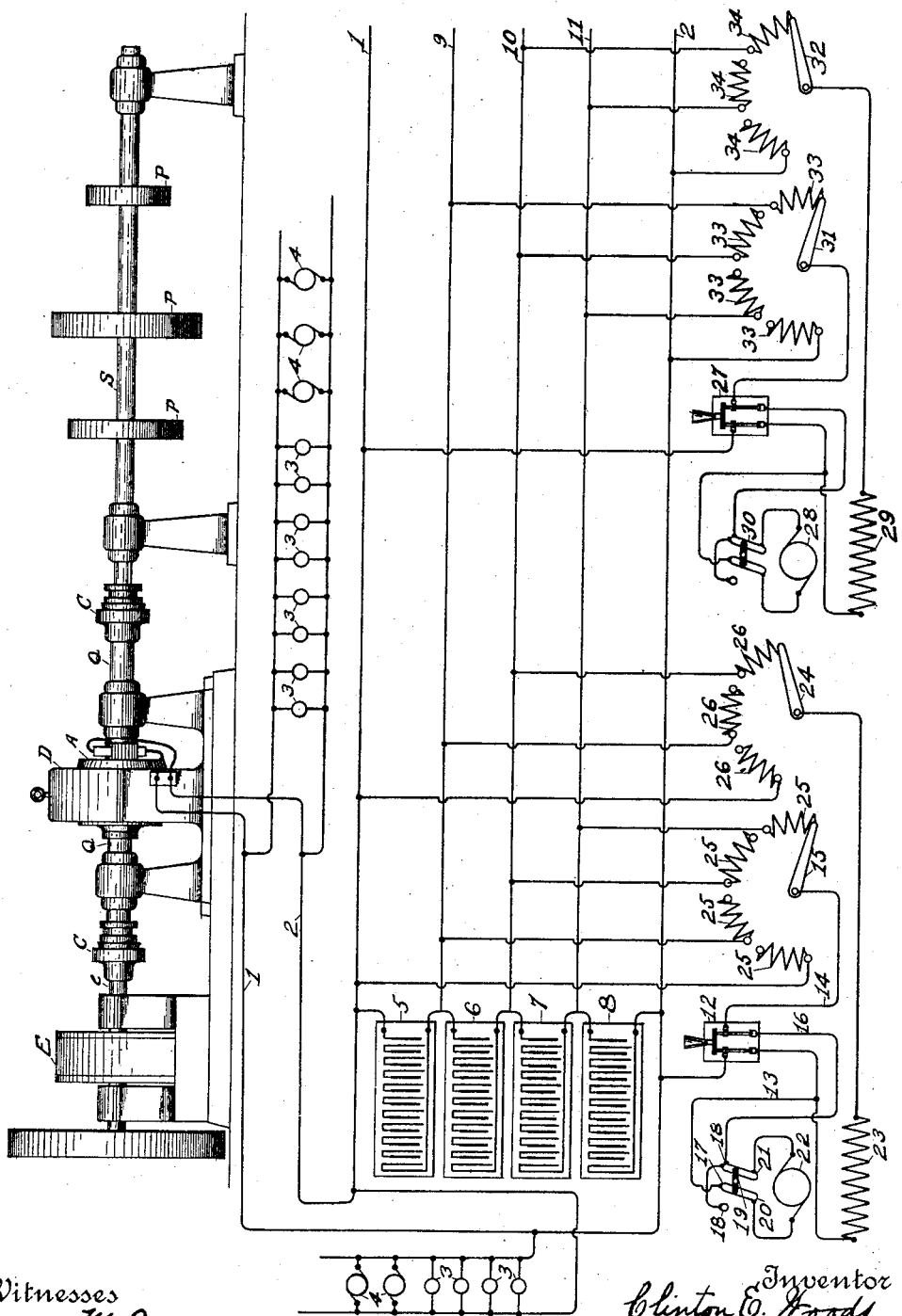
Witnesses
James M. Sawyer
Alice T. Burrough.
Inventor
Clinton E. Woods
by
Cornelius D. Ehret
his Attorney No. 736,667.                                                           Patented August 18, 1903.

UNITED STATES PATENT OFFICE.

CLINTON E. WOODS, OF CHICAGO, ILLINOIS, ASSIGNOR, BY MESNE ASSIGNMENTS, TO THE KEYSTONE ELECTRIC COMPANY, OF ERIE, PENNSYLVANIA.

MULTIVOLTAGE SYSTEM.

SPECIFICATION forming part of Letters Patent No. 736,667, dated August 18, 1903.

Application filed June 12, 1902. Serial No. 111,255. (No model.)

*To all whom it may concern:*

Be it known that I, CLINTON E. WOODS, a citizen of the United States, residing at Chicago, State of Illinois, have invented a new and useful Multivoltage System, of which the following is a specification.

My invention comprises a system of distribution in which a secondary battery in conjunction with a generator is employed for the purpose of supplying electrical energy at several different voltages, and for the purpose of simultaneously carrying the peak of the load of a plant in cases where the prime mover and generator or either of them are not of a capacity large enough to sustain the heaviest loads.

It comprises, further, in conjunction with the aforesaid system, a system of motor control in which different speeds are obtained by subjecting both armatures and fields of the motors to the several voltages of the supply-circuits leading from the secondary battery.

It consists also in a mechanical system of interconnecting the prime mover, generator, and power-shafting in any combination when used in connection with the system aforementioned.

The object of my invention is to provide a flexible distribution system more particularly for the power and lighting equipments of manufacturing plants, though it is to be understood that my system is equally well adapted for the distribution of light and power over large areas.

In many establishments it is desirable and necessary that machines be driven by independent motors which are capable of wide variation and speed. For this purpose a multivoltage supply system is a most efficient means and is obtainable by tapping off at suitable points in a series of secondary cells. Furthermore, it is often necessary to locate the generating apparatus in a limited space—a space which is frequently too small for the apparatus required to furnish sufficient energy for the highest demands of the system. This difficulty is met in my system by installing a prime mover and generator of capacity less than necessary for the maximum demand and aiding the generator at times of the greatest load by the same secondary battery which supplies the multivoltage-circuits, such battery being charged by the generator during the times when the load on the plant is less than the capacity of the generator. Furthermore, it is not desirable, even when space permits, to install primary movers and generators large enough to handle the entire plant because the maximum load of the plant seldom exists except for very short intervals of time, and in consequence the prime mover and generator are for the greater portion of the time operating under partial load only. By use of the secondary battery in connection with the prime mover and generator of smaller capacities than required for the maximum load the prime mover and generator during the times of very small load are additionally loaded by charging the secondary battery, and this secondary battery then in times of excessive load aids the generator and prime mover in sustaining the maximum demand for energy.

For a more detailed description of my system reference is to be had to the accompanying drawing.

At E is shown an engine or other prime mover whose shaft $e$ is secured to the left-hand member of clutch C, whose right-hand member is secured to the shaft S, which extends to the left through quill Q, carrying armature A of the dynamo D. At C' is a clutch whose right-hand member is secured to said shaft S and whose left-hand member is connected to quill Q. By closing both clutches both the dynamo and shaft S are driven by the engine E. By opening clutch C the dynamo and shaft S are entirely free from the engine E, in which case the dynamo D may operate as a motor to drive said shaft S. Leaving clutch C closed and opening clutch C', engine E drives shaft S and leaves armature A stationary. Conductors 1 and 2 lead from the terminals of the armature A, and across the conductors 1 and 2 are connected the lamps 3 and motors 4. At 5, 6, 7, and 8 are shown four banks of storage cells connected across said conductors 1 and 2, and tapped off between said banks of cells are circuit-leads 9, 10, and 11, which in conjunction with 1 and 2 comprise a multivoltage-supply system from which it is possible to obtain current at four different voltages.

At 12 is shown an ordinary two-pole switch which conducts current from circuit-lead 2 to the conductor 13. The remaining switch-blade puts conductor 14, which connects with switch-arm 15, into communication with the conductor 16. Conductors 13 and 16 lead to the contact-points 17 and 18, respectively, which are engaged by the blade of the reversing-switch 19, pivoted at contacts 20 and 21, which are connected to the two brushes of the motor-armature 22.

23 represents the field-winding of the motor whose one terminal connects to conductor 13 and whose remaining terminal connects to the switch-arm 24.

Switch-arm 15 engages with eight different contacts, alternate ones of which connect with the conductors 1, 9, 10, and 11, and between these alternate contacts are inserted resistances 25. The switch-arm 24 in the field-circuit engages with six different contacts, alternate ones of which connect with the conductors 1, 9, and 10, and between these alternate conductors are inserted the resistances 26, as shown, terminating in three additional contacts.

In the position shown the armature 22 is subjected to the potential difference existing across conductors 2 and 11, and in series with said armature is a section of resistance 25. Armature 22 then is supplied by the current from bank 8 through a resistance-conductor. At the same time the field-winding 23 is connected across the conductors 2 and 10 and has in series with it a section of resistance 26. This means, therefore, that the field-winding 23 is subjected to a potential difference across banks 7 and 8 and has in addition a section of resistance in series with it. This gives the weakest field by the arrangement shown, though it is possible to add two more contacts to said field-switch, in which case another section of resistance would be added and connections made with conductor 11. For general purposes, however, this would give too weak a field to insure sparkless commutation. By moving switch-arm 15 in a counter clockwise direction the first section of resistance is cut out upon reaching the first contact above the position shown, which will slightly increase the speed of the armature with the field excitation remaining the same. Moving the arm to the next contact will subject armature 22 to the difference of potential existing between conductors 2 and 10 and will insert in series with it a section of resistance. Moving the switch-lever to the next contact-point will cut out this section of resistance and subject armature 22 to the full potential difference of the conductors 2 and 10; and so on, the process of cutting out resistances and subjecting the armature to progressively-increasing potentials will raise the speed of the armature to a point corresponding to the full difference of potential of the armature A or the entire storage battery, while the field excitation remains the same. Now moving the switch-arm 24 in a counter clockwise direction will first cut out a section of resistance 26, and thereby slightly increase the field strength, which will reduce the speed of the motor. Moving it to the next contact will insert a new section of resistance in series with the field-winding, but subject it to a potential difference existing between conductors 2 and 9, again increasing the strength of field, and so on until the full potential difference existing between conductors 1 and 2 is exerted upon the terminals of the field-winding 23. It is thus seen that with a given field excitation there are eight different speeds of the armature. With the armature subjected to a certain potential difference six different speeds may be obtained by a variation of the field, or altogether forty-eight variations in speed may be obtained. By moving the switch-blade 19 to the left the current through the armature may be reversed, thereby reversing the motor.

At 27 is shown another double-pole switch which supplies the current to the motor, whose armature is shown at 28, whose field is shown at 29. A reversing-switch similar to 29 is shown at 30, and switch-arms 31 and 32 in the armature and field windings, respectively, operate in conjunction with resistances 33 and 34, as described above. It is to be noticed, however, that the motor to the right is connected to the opposite side and symmetrically with the motor shown to the left. This is done in order to render the load on the different banks or cells as symmetrical as possible. If, however, all the motors were connected as shown at the left, the bank 8 would be loaded at all times, while banks 7, 6, and 5 would be progressively less loaded. Therefore to insure a more equal demand on the several banks of cells the motors and other translating devices are connected symmetrically.

Armature A might deliver current at a pressure of two hundred and fifty volts, which could supply directly the lamps 3 and the motors 4. In this case each of the banks of cells 5, 6, 7, and 8 would contain thirty-two cells in series and there would exist, therefore, across each bank of cells a difference of potential of sixty-two and one-half volts. This means that as low a potential as sixty-two and one-half volts could be used to supply the motors and that potentials of one hundred and twenty-five, one hundred and eighty-seven and one-half, and two hundred and fifty volts can be obtained. It is to be understood, however, that the different banks may contain different numbers of cells, so that instead of equal steps in voltage unequal steps may be obtained. The proportions given above, however, will suit admirably to ordinary practice.

By disconnecting the engine from the dynamo D and the shaft S the batteries may supply the motors and lamps, as shown, and it may also supply current back into dynamo D to operate it as a motor to drive the shaft S. When an excess of power is required from the shaft S, the batteries may supply the lamps and motors in the usual manner and may drive dynamo D as a motor to assist the engine E in driving shaft S. In cases where the demand for electrical and mechanical power is far below the capacity of the plant the dynamo A charges the storage cells and supplies the current to lamps 3 and motors 4 directly, and while this charging is going on the variable-speed motors may be used off of said batteries, as described. When none of the motors or lamps are making demand for current, the entire energy of the engine is transmitted to the batteries and stored up. If any part of the total capacity of the current generated by the engine is needed by the lamps or motors, the surplus will go into the batteries. If, however, the lamps and motors exceed the capacity of the engine, which will be at a point which will produce a slight overload, the potential consequently being sufficiently dropped in the dynamo to be equal to the demand of the batteries, the batteries will direct the current to the main circuits 1 and 2 in conjunction with that which is being delivered from the dynamo. By this means a constant load factor is always provided for the engine and any surplus power is stored up, and upon demands for power in excess of the engine's capacity this stored power is delivered back to the main circuits, thus providing means that reach a very high economy.

As above described, it is seen that the engine may drive the entire line-shaft while the armature of the dynamo is stationary and the rest of the plant is being supplied, if necessary, from the storage batteries. The engine may drive the entire line-shaft and the dynamo used as a generator or the engine may be shut down and the dynamo used as a motor with current from the storage battery, and, furthermore, the engine and dynamo operating as a motor may both operate jointly to drive the line-shaft. This means that with a given horse-power double the power of the engine can be delivered to the line-shaft by the use of a proper size of storage battery. This combination is so generally effective that the entire plant may at times be run off of the storage batteries in the case of repairs to the steam plant or a full charge of the batteries and the engine still delivering surplus power. This means one-half the amount of steam equipment usually supplied for an industrial plant, the highest degree of economy in operation, the highest flexibility of power transmission, and a general reduction in cost and maintenance.

By the term "dynamo" is to be understood the generic term embracing both the generator and motor—that is, when the dynamo is driven and generates current it is a generator and when having current supplied to it runs as a motor.

What I claim is—

1. The combination of a generator and prime mover, a secondary battery in circuit with said generator, a multivoltage-circuit supplied by said battery, motor-armatures, means for subjecting said armatures to the several potentials of the multivoltage-circuit, field-windings, and means for subjecting said field-windings to the several potentials of the multivoltage-circuit.

2. The combination of a generator and prime mover, a secondary battery in circuit with said generator, a multivoltage-circuit supplied by said battery and generator, motor-armatures, means for subjecting said armatures to the several potentials of the multivoltage-circuit, field-windings, and means for subjecting said field-windings to the several potentials of the multivoltage-circuit.

3. In a system of distribution, a multivoltage-circuit, a motor-armature, means for subjecting said armature to the different potentials of said multivoltage-circuit, a field-magnet winding, and means for subjecting said winding to the different potentials of the multivoltage-circuit.

4. In a system of distribution, a multivoltage-circuit, a motor-armature, means for subjecting said armature to the different potentials of said multivoltage-circuit, means for inserting resistance into the circuit of said armature for obtaining speeds intermediate those produced by the different potentials, a field-winding, and means for subjecting said field-winding to the different potentials of said multivoltage-circuit.

5. In a system of distribution, a multivoltage-circuit, a motor-armature, means for subjecting said armature, to the different potentials of said multivoltage-circuit, means for inserting resistance into the circuit of said armature for obtaining speeds intermediate those produced by the different potentials, a field-winding, means for subjecting said field-winding to the different potentials of said multivoltage-circuit, and means for inserting resistance in said field-winding circuit for obtaining field strengths intermediate those produced by the different potentials of the multivoltage-circuit.

6. In a system of distribution, a multivoltage-circuit, a plurality of motors supplied thereby, and means for subjecting said motors to the different potentials of the multivoltage system, alternate motors having a permanent connection with opposite conductors of the multivoltage-circuit.

CLINTON E. WOODS.

Witnesses:
ALICE T. BURROUGH,
MAE HOFMANN.